M. K. DAVIS.
NOISE REDUCING TYPE WRITER SUPPORT OR STAND.
APPLICATION FILED JUNE 27, 1916.
1,253,473. Patented Jan. 15, 1918.
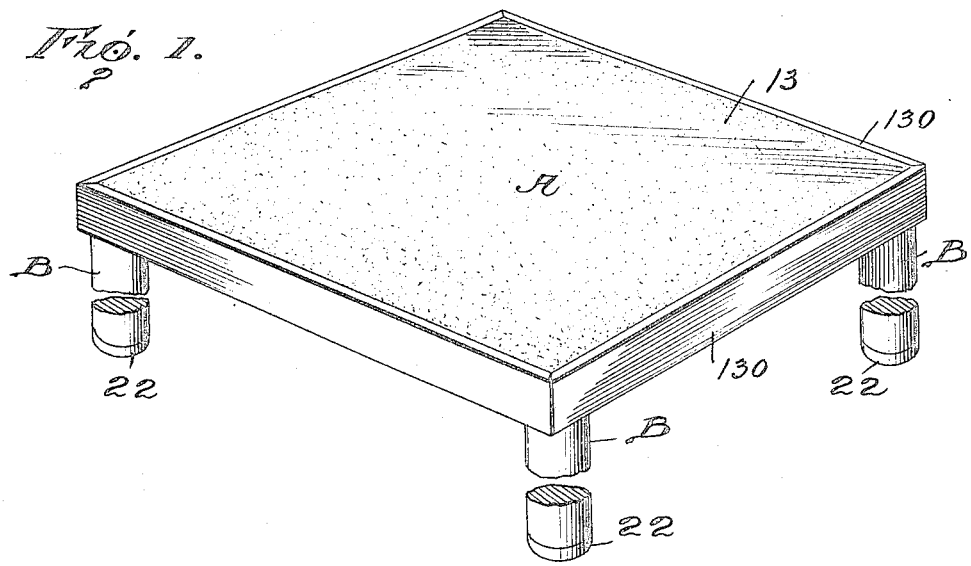
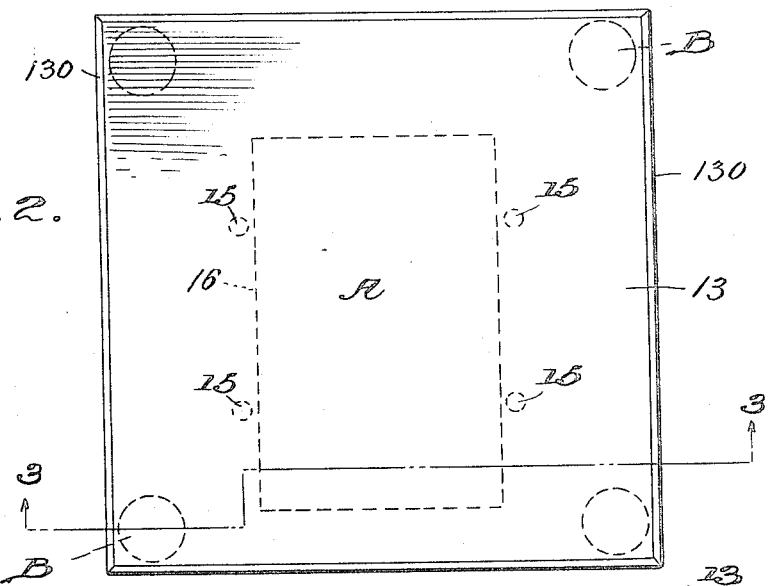
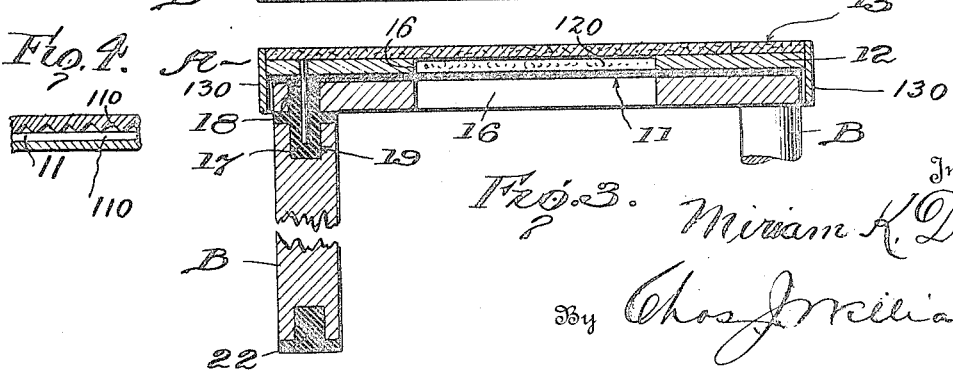
Inventor
Miriam K. Davis
By Chas. J. Williamson
Attorney

UNITED STATES PATENT OFFICE.

MIRIAM K. DAVIS, OF ST. LOUIS, MISSOURI.

NOISE-REDUCING TYPE-WRITER SUPPORT OR STAND.

1,253,473.  Specification of Letters Patent.  Patented Jan. 15, 1918.

Application filed June 27, 1916. Serial No. 106,205.

*To all whom it may concern:*

Be it known that I, MIRIAM K. DAVIS, a citizen of the United States, and resident of St. Louis, in the county of St. Louis City and State of Missouri, have invented a certain new and useful Improvement in Noise-Reducing Type-Writer Supports or Stands, and do hereby declare that the following is a full, clear, and exact description thereof.

Noise resulting from the operation of typewriting or other keyed machines is greatly increased by reflection of the sound from neighboring surfaces, especially if the top of the table or stand or desk on which the machine be placed consist of a solid, hard surface. In addition to this noise, the operation of the machine, entailing a number of blows or percussions in rapid succession, produces a series of vibrations which, if transmitted to the floor, tend to affect the health of those persons occupying the same room, and especially of the operator of the machine. The object of my invention is to eliminate, as far as possible, the reflection of sound and the transmission of sound and other vibrations to the floor of the room in which the machine is operated. This is accomplished by providing a stand or support of such a nature as to percussions, the reflection of sound-waves from the surface upon which the machine rests and the transmission of sound-waves that would otherwise be reflected back from surrounding sound-reflecting surfaces; also to prevent the transmission of other vibrations from the bed of the table or stand to the floor; and to accomplish this by a construction which may be easily and cheaply manufactured, and which will have other desirable characteristics unimpaired by reason of its adaptation to the elimination or reduction of noise and other vibrations.

In the accompanying drawings—

Figure 1 is a perspective view of a typewriter stand embodying my invention;

Fig. 2 is a top plan view thereof;

Fig. 3 is a vertical section on the line 3—3 of Fig. 2.

Fig. 4 is a detail view in section, on an enlarged scale, of the preferred construction of the rubber layer.

In the construction shown by the drawings in which I have embodied my invention, as one exemplification thereof, the stand has the general characteristics of a table, in that it has a top A and four legs B for supporting the table from the floor to place the typewriting machine at the desired level for comfortable and convenient operation.

The table top is built up of layers of different materials, certain of which, preferably made of wood, constitute the framework or foundation thereof; the preferred layer-like arrangement comprising, first, a bottom layer of wood, of thickness sufficient to insure the necessary strength, next a layer of rubber or other non-reflecting and non-conducting material, 11, then above the latter a layer of wood, 12, which may be thinner than the bottom layer, and finally a top layer of felt or other sound-absorbing material, 13. Preferably, on the top felt layer is a narrow border or margin formed of wood, and a wooden curtain or apron extending downward from this, but not in contact with the lower layer of wood at any point, serves as a finish and concealment of the otherwise unsightly appearance of the structure. As shown in the drawing, the two layers of wood are not continuous surfaces, for wood is a sonorous substance, and used beneath the working parts of the typewriting machine would serve to reflect the noise. These layers are in the form of a frame-work, supporting the feet of the typewriter, but not extending under its working parts in such manner as to reflect the blows of percussions. The open space thus left between layers 11 and 13 is loosely filled with some soft and non-conducting substance, such as cotton, or mineral wool, thus forming a cushion directly beneath that part of the typewriter where the blows are given.

The position of the typewriter feet is indicated by the circles 15 in dotted lines in Fig. 2. The openings 16 in the wooden layers are carried as close as possible to the front edge of the table, since the more nearly the machine can rest as on the lap of the operator the more convenient it will be to operate. The cushion beneath the working parts of the typewriter serves not only to lessen the reflection of sound but also to protect the machine against the dust rising from the floor when being swept.

The layer of rubber is preferably composed of two sheets having a cellular formation on one side, as for example by corrugations, and the two sheets are placed with their cellular sides toward each other, the corrugations running transversely. Rubber such as is used for stepping may be used for this layer.

To prevent the transmission of sound to and through the legs, a sound-deadening device is interposed between the top and the upper end of each leg, which device, as shown is in the form of a plug 17 of rubber that extends up through a hole 18 in the bottom wooden layer and the rubber layer, and down into a hole or socket 19 in the upper end of the leg, and said plug has between its ends a flange 20 that is interposed between the bottom wooden layer and the top end of the leg. As rubber or any other elastic substance would lack the rigidity necessary to a typewriting stand, a core or pin of wood or metal is driven through the top layer of wood down into this rubber plug to a point below the top of the leg, but not to the end of the plug, so that while lateral vibration is prevented by this rigid pin or core, there is no contact of one sound-conducting material with another.

At the lower end each leg has a flanged rubber plug 22 as a still further means of preventing the transmission of sound and other vibrations.

It will be evident that I have produced a typewriter stand or support which, while possessing all required strength and rigidity for supporting the machine, will nevertheless so isolate the machine from sonorous bodies that the noise resulting from the blows or percussions incident to the operation of the machine will be reduced to a minimum.

Of course, in regard to the details of construction and such matters as the design or contour of the structure, changes may be made which will involve no departure from the scope of my invention when considered in the broad aspects thereof; such variations involving questions of workmanship rather than of invention.

Having thus described my invention, what I claim is—

1. A support for key-operated machines comprising two layers of wood, said layers being cut away beneath the working parts of the machine, a layer of non-resonant material between the two layers of wood, and reaching across the hole formed by the cut-away portion of the wood layers, and a layer of non-resonant material on top of the uppermost layer of wood.

2. A support for key-operated machines, comprising a stratified or layer-like platform, certain of the layers being cut away beneath the working parts of the machine, and certain other layers extending over the opening so formed, the space between the complete layers made by cutting away the upper or second layer of rigid material being filled with soft and non-conducting material, forming a sort of cushion under the working parts of the typewriter.

3. A support for key-operated machines, comprising a stratified or layer-like platform, certain of the layers being of stiff material to impart rigidity to the structure, and being cut away from beneath the working parts of the machine, and certain others of softer and non-resonant material, and legs on which said platform is mounted, said legs being separated from the platform by sound insulating material.

4. A support for key-operated machines, comprising a stratified or layer-like platform, certain of the layers being of stiff material to impart rigidity to the structure, and certain being sheets of rubber with corrugations, the corrugations of one sheet being placed transversely of those of the adjacent sheet.

5. A support for key-operated machines, comprising a stratified or layer-like platform the layers alternating and consisting respectively of wood, rubber and felt, the wood being cut away beneath the working parts of the machine.

6. A support for key operated machines, comprising a stratified or layer-like platform, the layers alternating and consisting respectively of wood, rubber and felt, the wood being cut away beneath the working parts of the machine, and legs by which the platform is supported, between which and the platform rubber blocks are interposed.

7. A support for key-operated machines, consisting of a stratified or layer-like arrangement of rigid and softer substances alternating, the rigid or sound-reflecting layers being cut away beneath the working parts of the machine, supported by legs attached to the platform by means of a plug of elastic material, but stiffened by a rigid core of such length as to preserve the lateral rigidity while preventing the contact of sound-transmitting materials.

8. A support for a key-operated machine, consisting of a stratified or layer-like arrangement of rigid and elastic materials alternating, the rigid materials being cut away from beneath the working parts of the machine, and the space between the elastic layers being filled with soft or non-conducting material; the platform being supported by legs attached to it by means of a plug of elastic material, having a rigid core extending below the top line of the leg, but not of such length as to form a medium of transmitting sound and vibration from the rigid layers of the platform to the legs or other support thereof.

In testimony that I claim the foregoing I have hereunto set my hand.

MIRIAM K. DAVIS.